United States Patent
Yoshidome (10) Patent No.: US 10,158,778 B1
(45) Date of Patent: Dec. 18, 2018

(54) IMAGE FORMING SYSTEM, TERMINAL, AND IMAGE FORMING METHOD THAT CONTROL JOB BY COMMAND IN TERMINAL

(71) Applicant: KYOCERA Document Solutions Inc., Osaka (JP)

(72) Inventor: Gin Yoshidome, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/664,714

(22) Filed: Jul. 31, 2017

(51) Int. Cl.
*G06F 15/00* (2006.01)
*H04N 1/00* (2006.01)
*G06F 3/12* (2006.01)

(52) U.S. Cl.
CPC ......... *H04N 1/00954* (2013.01); *G06F 3/126* (2013.01); *G06F 3/1207* (2013.01); *G06F 3/1222* (2013.01); *G06F 3/1238* (2013.01); *G06F 3/1267* (2013.01); *G06F 3/1285* (2013.01); *H04N 2201/0094* (2013.01)

(58) Field of Classification Search
CPC ........ H04N 1/00954; H04N 2201/0094; G06F 3/1222; G06F 3/1207; G06F 3/1238; G06F 3/1285; G06F 3/126; G06F 3/1267
USPC ....................................................... 358/1.14
See application file for complete search history.

(56) References Cited

U.S. PATENT DOCUMENTS

| | | | | |
|---|---|---|---|---|
| 9,036,186 B2 * | 5/2015 | Nuggehalli | ........... | G06F 3/1207 358/1.14 |
| 2013/0063774 A1 * | 3/2013 | Nuggehalli | ........... | G06F 3/1207 358/1.15 |
| 2014/0380077 A1 | 12/2014 | Hara | | |
| 2015/0277806 A1 * | 10/2015 | Shibata | ................ | G06F 3/1203 358/1.14 |
| 2016/0092148 A1 * | 3/2016 | Shintani | ................ | G06F 3/1212 358/1.15 |

* cited by examiner

*Primary Examiner* — Saeid Ebrahimi Dehkord
(74) *Attorney, Agent, or Firm* — Hawaii Patent Services; Nathaniel K. Fedde; Kenton N. Fedde

(57) ABSTRACT

Provided is an image forming system that controls an image forming apparatus from a terminal with sufficient usability for a user. The image forming system includes the terminal and the image forming apparatus. The job accumulating part accumulates a job. The command acquiring part acquires the command for setting time and executing for the job accumulated by the job accumulating part. The command interpreting part interprets the command acquired by the command acquiring part. The command instructing part performs the instructions to execute the job in the image forming apparatus at the set time corresponding to the command interpreted by the command interpreting part. The job executing part executes the job with an instruction acquired from the command instruction part of the terminal.

20 Claims, 7 Drawing Sheets

IMAGE FORMING SYSTEM, TERMINAL, AND IMAGE FORMING METHOD THAT CONTROL JOB BY COMMAND IN TERMINAL

BACKGROUND

The present disclosure is especially according to a job-controllable image forming system, a terminal, and an image forming method.

An image forming apparatus, such as an MFP (Multifunctional Peripheral,) that can print a document and an image, is present.

Some typical image forming apparatus can be reserved as a usable image forming apparatus, easily, and is capable of minimizing down time. In the image forming apparatus, when a request to print out files including reservation time is received from a portable terminal apparatus for a user who is a subscriber, it determines whether the present time is the respective reservation time or not. If the present time is the reservation time as a result of a decision, use of the apparatus by other users is prohibited in case of fulfilling a specified condition including a condition that the subscriber's portable terminal apparatus comes nearby the apparatus. Also, if use of the apparatus is prohibited, it determines whether the user who comes to the apparatus is the subscriber or not, and if the user is the subscriber, prohibition of use of the apparatus will be canceled.

SUMMARY

An image forming system in the present disclosure includes a terminal and an image forming apparatus. The terminal includes a job accumulating part, a command acquiring part, a command interpreting part, and a command instructing part. The job accumulating part accumulates a job. The command acquiring part acquires a command for setting time and executing for the job accumulated by the job accumulating part. The command interpreting part interprets the command acquired by the command acquiring part. The command instructing part instructs to execute the job in the image forming apparatus at the set time corresponding to the command interpreted by the command interpreting part. The image forming apparatus includes a job executing part. The job executing part executes the job with an instruction acquired from the command instructing part in the terminal.

A terminal of the present disclosure includes a job accumulating part, a command acquiring part, a command interpreting part, and a command instructing part. The job accumulating part accumulates a job. The command acquiring part acquires a command for setting time and executing for the job accumulated by the job accumulating part. The command interpreting part interprets the command acquired by the command acquiring part. The command instructing part instructs to execute the job in an image forming apparatus at the set time corresponding to the command interpreted by the command interpreting part.

A control method of the present disclosure is a control method for the image forming apparatus that controls the image forming apparatus by a terminal. In this method, a job is accumulated. Also, a command being sets time and executing the accumulated job is acquired. Also, the acquired command is interpreted. Then, corresponding to the interpreted command, an instruction that execute the job in the image forming apparatus at the set time is performed.

DETAILED DESCRIPTION

<Embodiment>

[System Configuration of Image Forming System X]

Figure 1:
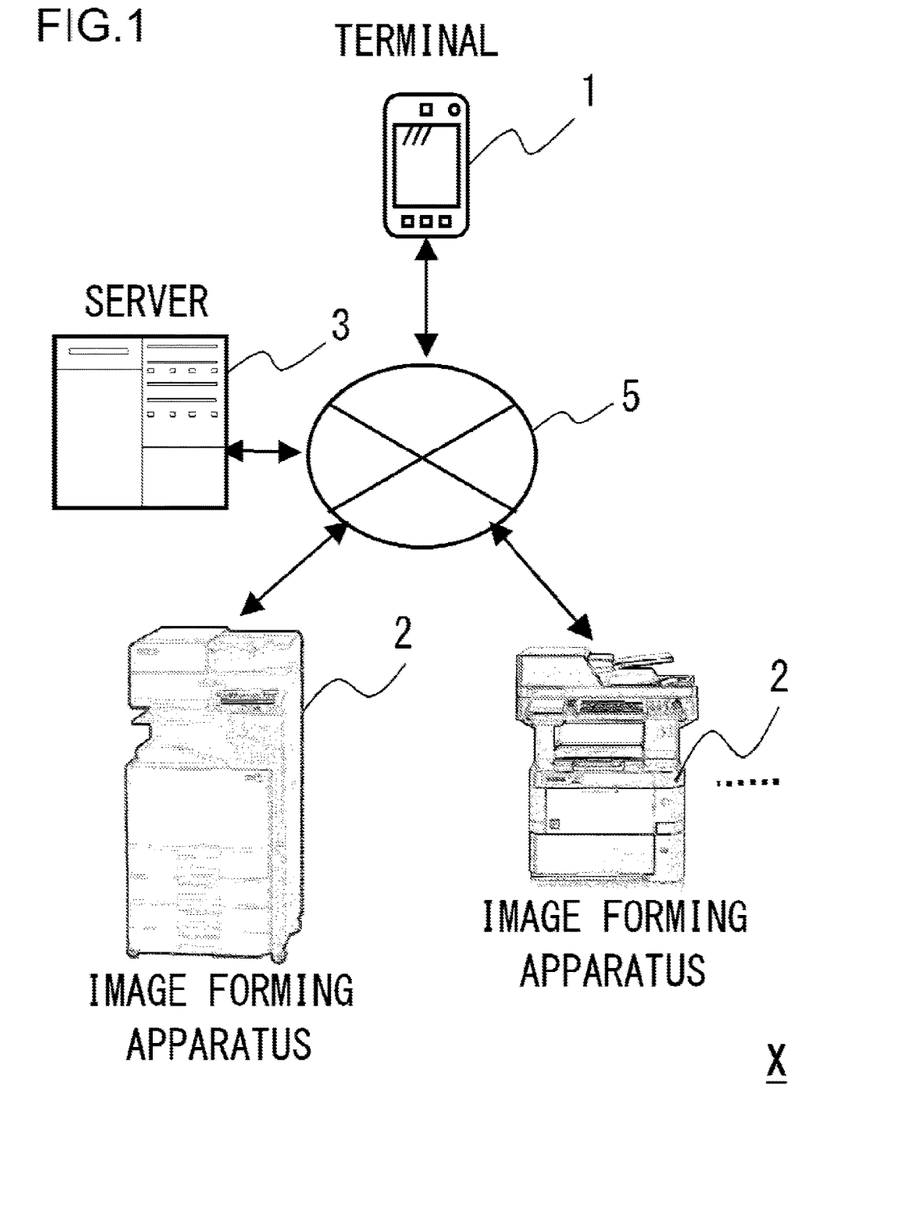
FIG. 1 is a system configuration figure of an image forming system according to an embodiment in the present disclosure.

Firstly, as refer to FIG. 1, a system configuration of image forming system X is explained. Image forming system X according to the embodiment in the present disclosure includes terminal 1, image forming apparatus 2, and server 3. Also, each apparatus is connected with network 5.

Terminal 1 is an information processing apparatus that can generate and control job 300 (FIG. 3) for image forming apparatus 2. Terminals 1 may be, for example, a smart phone, a mobile phone, PDA (Personal Data Assistant,) PC, or the like. Also, terminal 1 executes a kind of general-purpose OS (Operating System.) Also, terminal 1 can install a device driver for image forming apparatus 2. Thereby, terminal 1 generates job 300 by using OS and a various application software (hereinafter, it only calls an "application") and transmits job 300 to a transmission destination, and it is possible to use a function having in the transmission destination. These various applications may be, for example, a web browser, a word processor, a spreadsheet, presentation software, or the like. Also, terminal 1 can install and execute a dedicated application provided with function that controls image forming apparatus 2. Also, terminal 1 may be provided with "alarm" function that acquires time from an internal clock, GPS, a radio wave base station, server 3, or the like, and executes a specific process in that time. Also, terminal 1 may be provided with the "calendar" function that sets a schedule by PIM (Personal Information Manager), a web calendar, and a groupware for diligence-and-indolence management, or the like, and executes a specific process in the time of the schedule. The alarm and the calendar may be provided and may be executed by using function of OS or an application. In addition, it is also possible to realize the function of the alarm and the calendar by the dedicated application.

Image forming apparatus 2 is an MFP, a printer, or the like. Also, image forming apparatus 2 may be a transmission destination where terminal 1 transmits job 300 under control. Also, as described later, in case that job 300 is a job of a scan, image forming apparatus 2 can transmit a scanned document file to terminal 1. Also, for example, image forming apparatus 2 may be provided with a document box for each user, or the like.

Server 3 may be a server of a storing source of a document of job 300, or the like. For example, server 3 may be a web storage on a cloud, PC (Personal Computer) server, NAS (Network Attached Storage) on LAN, or the like. Also, server 3 may have a document box for each user, or the like, for example. Also, server 3 may be a server, or the like, which stores messages, such as an e-mail and a message of a messenger. Also, server 3 may include a server having "calendar" function. Also, server 3 may have NTP (Network Time Protocol) server function.

Network 5 is LAN (Local Area Network), such as intranet (Intranet), WAN (Wide Area Network), such as the Internet, a mobile phone network, or the like, in the present embodiment.

In addition, image forming system X may have a plurality of servers 3 and/or image forming apparatuses 2, respectively. On the contrary, a configuration in which server 3 is not present is also possible.

Figure 2:
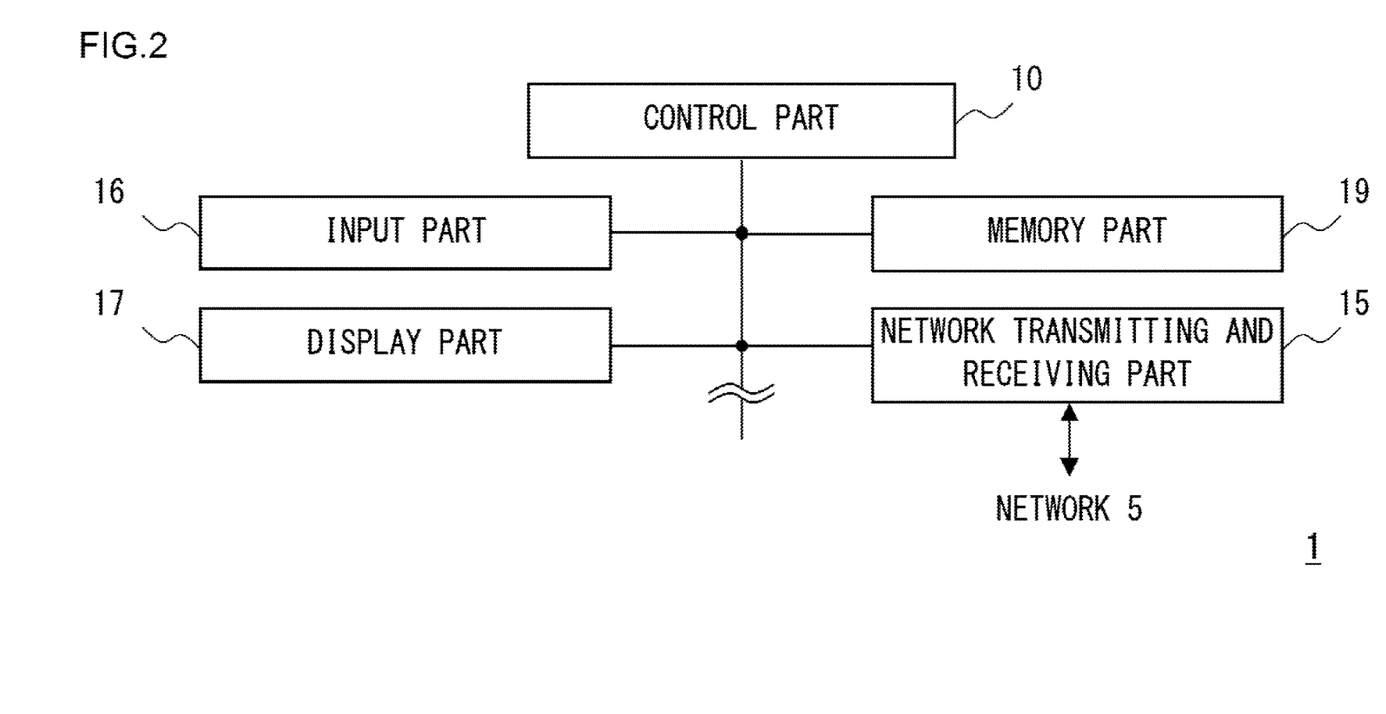
FIG. 2 is a block diagram showing a configuration of the terminal as shown in FIG. 1.

As refer to FIG. 2, terminal 1 includes control part 10, network transmitting and receiving part 15, input part 16, display part 17, and memory part 19.

Control part 10 is an information processing part, such as CPU (Central Processing Unit,) or the like.

Network transmitting and receiving part 15 is a network connection part for connecting with network 5.

Input part 16 is a keyboard, various sensors, a pointing device, or the like, for acquiring the various instructions by a user. The pointing device includes a touch panel, a digitizer, a touch pad, or the like. Also, by an instruction that the user inputs on input part 16, it is also possible to make or transmit job 300 (FIG. 3,) to input or change each user information, or the like.

Display part 17 may be a dot-matrix display. Display part 17 can display a various operation screens for GUI (Graphical User Interface.)

Input part 16 and display part 17 are possible to make the user input and acquire various instructions by GUI on OS.

In addition, input part 16 and display part 17 may be integrally-formed as like a display with a touch panel, digitizer, or the like.

Memory part 19 is a non-transitory recording medium. Also, memory part 19 may include external storages, such as various flash memories, an optical recording medium, or the like.

Also, a control program for operation-controlling terminal 1 is stored in memory part 19. The control program includes programs and data for OS, various applications, or the like. Also, the control program may include a middleware that works on OS, the device driver that controls image forming apparatus 2 by instructions, or the like. Also, memory part 19 may store user account settings, a document box, or the like.

In addition, control part 10 may contain a non-transitory recording medium. Also, control part 10 reads the control program stored in memory part 19 and executes by expanding the control program, and it is operated as each part of functional blocks as described below.

[Functional Configuration of Image Forming System X]

Figure 3:
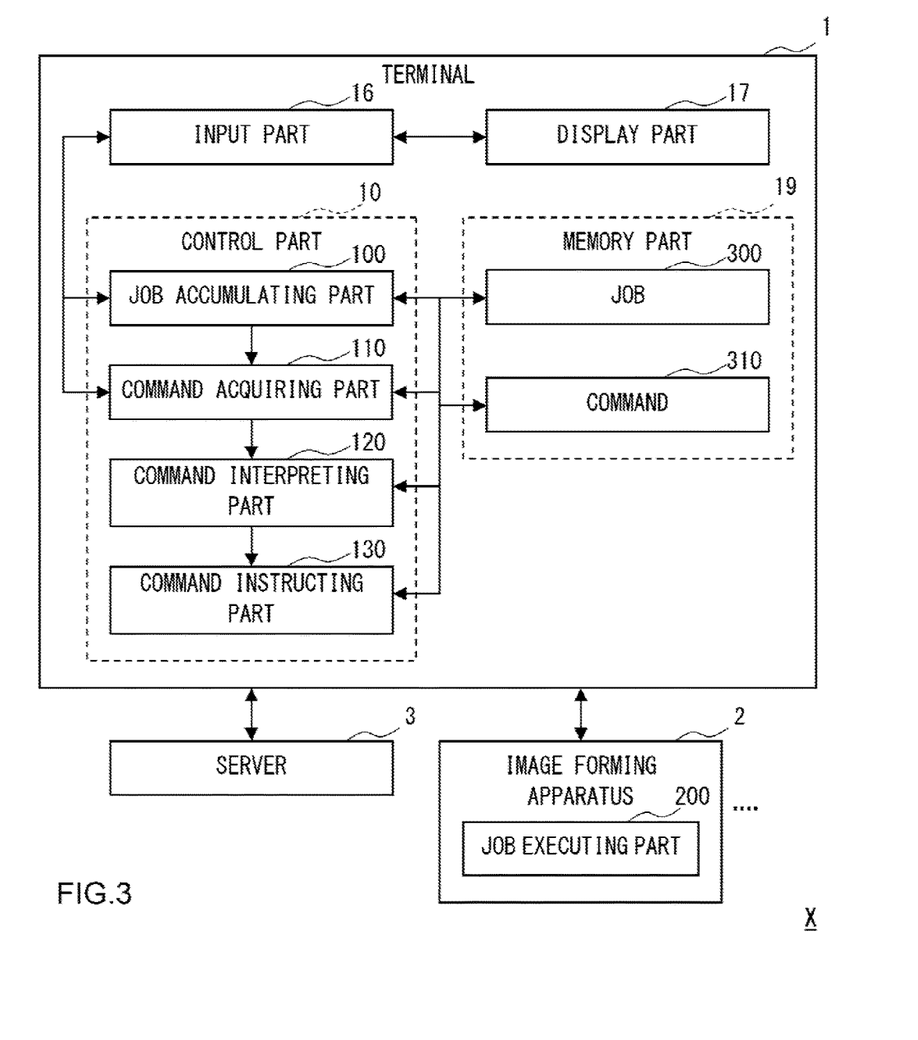
FIG. 3 is a block diagram showing a functional configuration of the image forming system according to the embodiment in the present disclosure.

Here, as refer to FIG. 3, a functional configuration of image forming system X is explained. Control part 10 in terminal 1 includes job accumulating part 100, command acquiring part 110, command interpreting part 120, and command instructing part 130. Also, memory part 19 in terminal 1 stores job 300 and command 310. Image forming apparatus 2 includes job executing part 200.

Job accumulating part 100 accumulates job 300. In detail, when a user instructs to execute job 300 in image forming apparatus 2 by various kinds of applications, job accumulating part 100 generates the job 300 and stores it in memory part 19, or the like. In addition, job 300 is made by the dedicated application and is stored in memory part 19.

Command acquiring part 110 acquires command 310 for setting time and executing for job 300 accumulated by job accumulating part 100. In detail, command acquiring part 110 executes the dedicated application for controlling image forming apparatus 2, or the like, and acquires command 310 for controlling to execute job 300 by GUI. According to the present embodiment, as described later, the command 310 is acquired from input part 16 as a character string of "label," or the like, inputted by the user. In addition, the dedicated application maybe apart of function of the device driver for image forming apparatus 2, maybe an application called from the device driver, or may be a specially-installed application, or the like.

Command interpreting part 120 interprets command 310 acquired by command acquiring part 110. Command interpreting part 120, in case that command 310 includes a character string as describe later, interprets meanings including specifiers of each character string, acquires an instruction, and sets it as control data to command 310 in memory part 19. In this case, command interpreting part 120 may execute a process that associates set-up command 310 with an alarm or a calendar.

Command instructing part 130 performs an instruction to execute job 300 in image forming apparatus 2 at the set time corresponding to command 310 interpreted by command interpreting part 120.

Job executing part 200 executes job 300 with the instruction acquired from command instructing part 130 in terminal 1. In job 300 of a print, for example, job executing part 200 receives job 300 from terminal 1 or server 3 via network 5, performs image formation, and records on a recording paper with a dry electrophotography system, an inkjet printing system, or the like. Also, in job 300 of a scan, job executing part 200 is possible to scan a manuscript with a scanner, to transmit scanned image to terminal 1 as a document file, or to save it in the document box. The document file may be, for example, PDF (Portable Document Format) file, PS (Post Script™) file, a file for various applications, a plain text file, a HTML (Hyper-Text Markup Language) file, or the like. Also, in job 300 of a transmission, job executing part 200 is possible to receive a document file from storing source, such as server 3, terminal 1, or the like, and to transmit it by e-mail, a messenger, FTP (File Transfer Protocol)) , a facsimile, or the like.

Job 300 is data corresponding to the operations executed in image forming apparatus 2. Job 300 may include, for example, PDL (Page Description Language) data and attribute data with control data of image forming apparatus 2. Also, job 300 may be a type, such as a print, a scan, or a transmission. In these, job 300 of a print is for image-forming a PDL data outputted from the application of terminal 1, a document file acquired from server 3, or the like, and for outputting it. Also, job 300 of a scan is for converting scanned image data into a document file and for transmitting to terminal 1, or the like. Also, job 300 of a scan may be for storing the document file in the document box of server 3, image forming apparatus 2, terminal 1, or the like. Also, job 300 of a transmission is for transmitting a document file by e-mail, a messenger, FTP, a facsimile, or the like. In these jobs 300, by command 310, as explained later, time for executing, or the like, is set, and various types of output, a scanning method, a transmission destination, or the like, are instructed.

Command 310 is control data for controlling the execution of job 300. In the present embodiment, command 310 includes the character string inputted by the user and the control data, which the character string is interpreted. In the present embodiment, command 310 includes the set time to execute job 300. For example, the set time may be the time corresponding to the alarm, the calendar, or the like, in terminal 1 or server 3. Also, command 310 corresponds to control of job 300 of types, such as a print, a scan, and/or a transmission. Also, command 310 includes a specifier of a repetition of a specific period as time. As the specific period, for example, it can set up in units, such as arbitrary time within set period, every day, and per hour. per minute, or the like.

Also, command 310 may include a specifier that sets job 300, a document file, or the like, by a specific formula. The specific formula may be an instruction of period, or the like, for time of making, editing, or accessing of job 300. Also, the specific formula may be a section of the alphabet, for example, "A-C", "D-H", or the like. Also, the specific formula maybe designation by a regular expression, a wild card, or the like. The regular expression may be based on various script languages.

Also, command 310 includes a specifier that prints or transmits with setting a sender. For example, the sender may be a sender of an e-mail, a sender of a messenger, or a maker of the document file. Also, the e-mail may be printed or transmitted only the texts of an e-mail or texts including an attached file.

Here, control part 10 in terminal 1 executes the control program stored in memory part 19, and is functioned as job accumulating part 100, command acquiring part 110, command interpreting part 120, and command instructing part 130. Also, the control part in image forming apparatus 2 executes the control program stored in the memory part and is functioned as job executing part 200. Also, above-mentioned each part of terminal 1 and image forming apparatus 2 serve as hardware resources that executes the image forming method in the present disclosure. In addition, the above-mentioned part or arbitrary combination of the functional configuration may be configured with an IC, a programmable logic, or the like, by using hardware.

[Image Forming Apparatus Controlling Process by Image Forming System X]

Then, as refer to FIG. 4-FIG. 7, an image forming apparatus controlling process by terminal 1 of image forming system X according to the embodiment in the present disclosure is explained. The image forming apparatus controlling process in the present embodiment accumulates job 300 from the application in terminal 1, or the like. Then, command 310 for setting time and executing is acquired for accumulated job 300. Also, acquired command 310 is interpreted. Then, corresponding to command 310, job 300 is executed in image forming apparatus 2 at the set time. The image forming apparatus controlling process in the present embodiment mainly executes the program control part 10 memorized in memory part 19 with collaborating each part by using hardware resources. In the following, with reference to the flow chart in FIG. 4, the details of image forming apparatus controlling process is explained for each step.

(Step S101)

Figure 4:
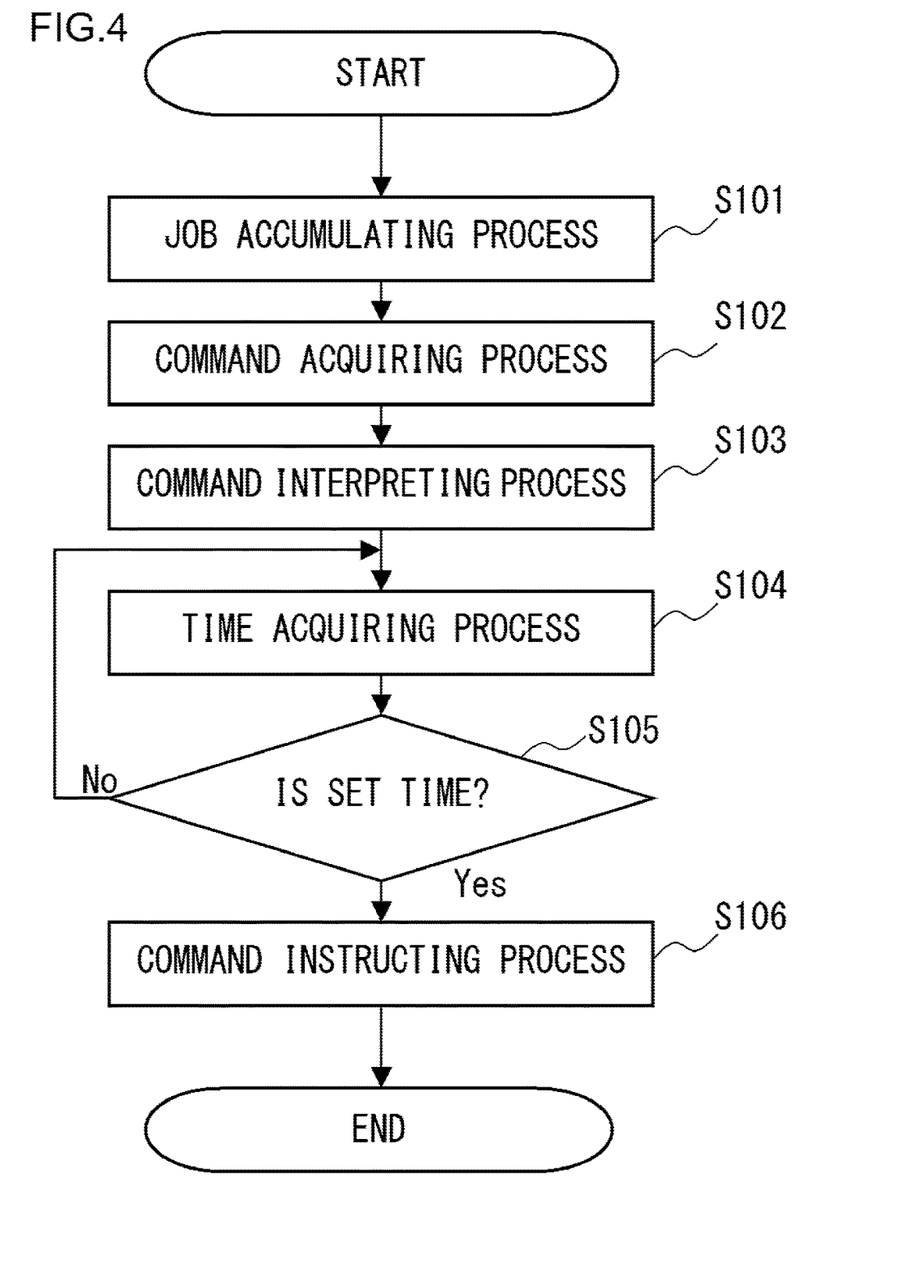
FIG. 4 is a flow chart of the image forming apparatus controlling process according to the embodiment in the present disclosure.

Firstly, job accumulating part 100 performs a job accumulating process. Job accumulating part 100 makes and outputs job 300 by using the device driver for image forming apparatus 2 by instructions from various applications and stores it in memory part 19. Also, job accumulating part 100 may make and output job 300 by instructions from the device driver of image forming apparatus 2 or the dedicated application, and it may store in memory part 19. Also, job accumulating part 100 may transmit made job 300 to server 3, or the like. In these cases, job 300 may be stored in the document box, temporally. Also, in these cases, job accumulating part 100 may set job 300 being controlled by command 310 from the device driver, the dedicated application, or the like, by user instructions.

(Step S102)

Then, command acquiring part 110 performs a command acquiring process. Command acquiring part 110 acquires command 310 for setting time and executing for accumulated job 300 by using GUI of the dedicated application.

Figure 5:
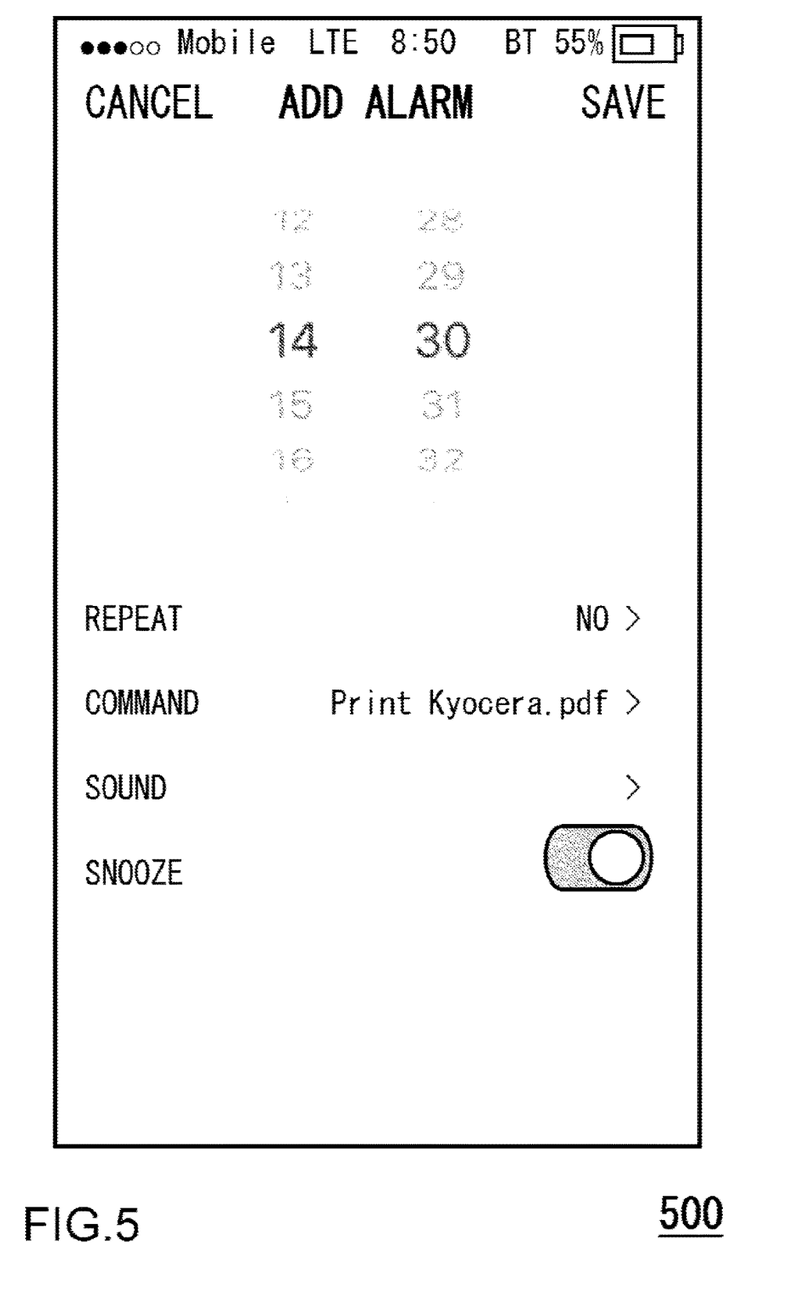
FIG. 5 shows an example screen of the image forming apparatus controlling process as shown in FIG. 4.

In detail, example screen 500 in FIG. 5 shows an example of acquiring command 310 that makes job 300 of a print execute in image forming apparatus 2 at PM 2:30 (14:30) as time. In this example, the user can set time by touching a time designating column, which is rendered under of the "ADD ALARM" column, to set the time of "alarm." In addition, it is also possible to display a menu, or the like, and to set not "alarm" but "calendar."

Also, in "REPEAT" column, the user can set a repetition of the same job 300 in a specific period. Also, in "COMMAND" column, the user can input a character string for "label," or the like, and can set up details of command 310 as described later. Also, in "SOUND" column, the user can set up to notify with a sound, vibration, or the like, at the execution time of job 300. Also, in "SNOOZE" column, the user can set "snooze," which has checking in the time of executing for job 300 and possibly extends to execute it at a specified interval. In addition, command acquiring part 110 can convert and acquire as a "specifier" of command 310 for inputting content of each column other than "command" column.

Also, on example screen 500, command acquiring part 110 displays a character string of command 310 corresponding to "print (filename)," which is already accumulated job 300 of a print, on "COMMAND" column. In addition, as other types of job 300, job 300 of a scan may be displayed as "scan," and job 300 of a transmission may be displayed as "send."

Figure 6:
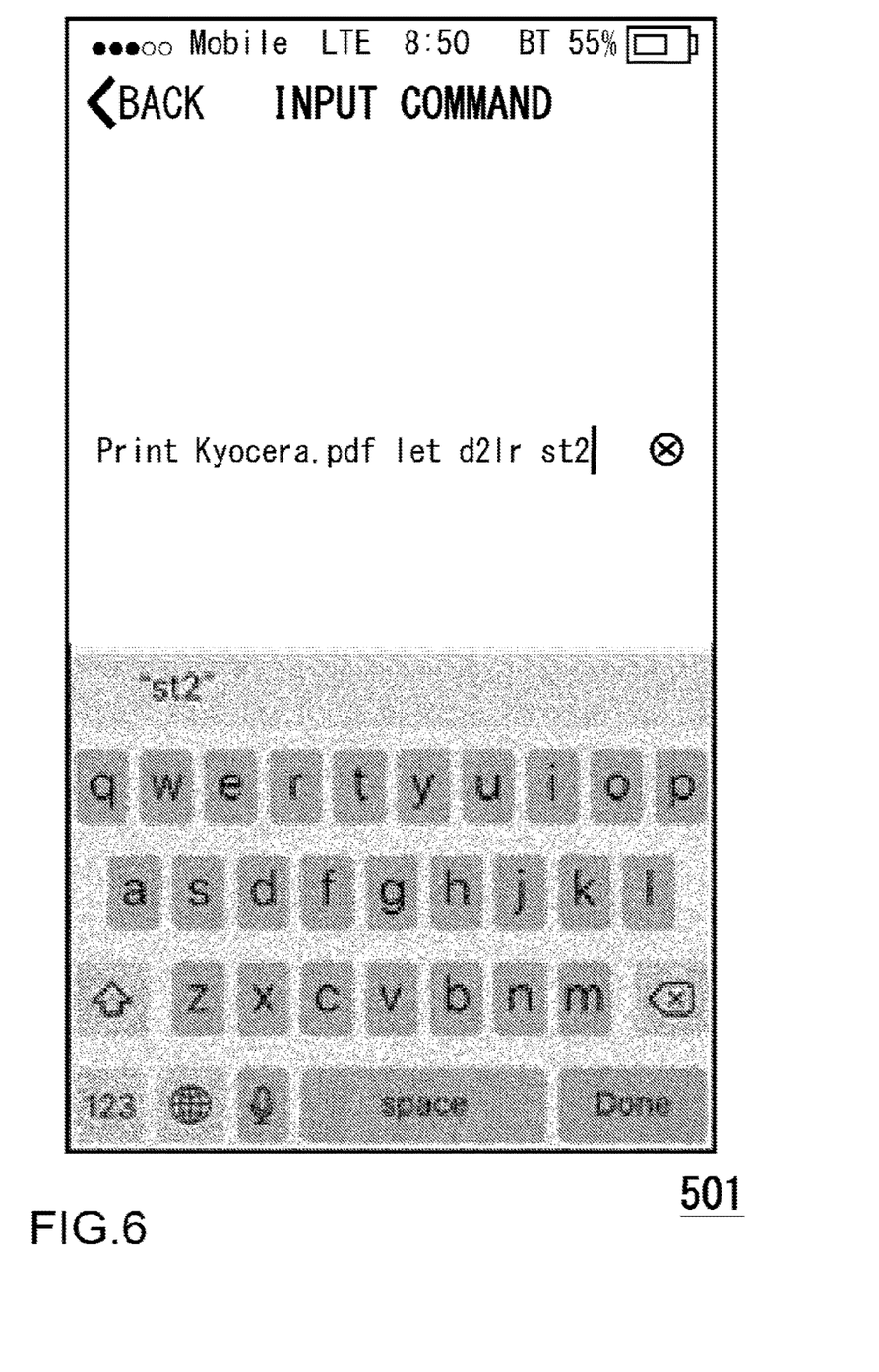
FIG. 6 shows an example screen of the image forming apparatus controlling process as shown in FIG. 4.

Also, example screen 501 in FIG. 6 shows an example that the user inputs "COMMAND" column. In this example, the user can input a character string of command 310 for controlling execution of job 300. If the character string of the command 310 is job 300 of a print, for example, as paper size, "A3", "A4", "A5", "A6", "Let (letter)", "Leg (legal)", "Sta", "Led", or the like, can be setup. Also, as settings of page collection, "D2LR," which is duplex of 2-page from left to right, "D2TB," which is duplex of 2-page from top to bottom, or the like, can be set up. Also, if settings of a finisher, "St2," which performs a two-place staple, "St3," which performs a three-place staple, "P2," which is two-place punch hole, "P3," which is three-place punch hole, or the like, can be set up. Also, if it is job 300 of a scan, similarly, it is possible to perform settings of paper size and page collection. Also, if it is job 300 of a transmission, it is possible to set up an e-mail addresses, a messenger address, URL of FTP, a telephone number of facsimile transmission, or the like, for a transmission destination.

Furthermore, an example in case that there is a list of the following accumulated jobs 300 is explained:

Apple.pdf 01/31/2017
Bear.pdf 02/01/2017
Can.pdf 02/02/2017
Dog.pdf 02/12/2017
Drummer.pdf 02/13/2017
Elephant.pdf 02/14/2017

The above list of jobs 300 is an example that indicates filenames of document files and access time. Here, for example, as a character string of a specifier that specifies job 300 by a specific formula, if it specifies "Print Date 1/31/2017-2/1" that sets the access period of job 300 to be printed, "Apple.pdf" and "Bear.pdf" are printed. Also, for example, as a character string of a specifier that specifies job 300 by a specific formula, if it specifies as "Print A-C" that sets the section "A-C" of the alphabet to be printed, "Apple.pdf", "Bear.pdf", and "Can.pdf" are printed. Also, for example, as a character string of a specifier that specifies job 300 by a specific formula, if character string of "Print ~le" that specifies by a wild card containing "le", "Apple.pdf" and "Elephant.pdf" are printed. In addition, if e-mails, messages, or the like, including "le" in a transmitting source or a transmitting destination, such as "Ellen@abc.com", or the like, may be printed. Also, if a document file, such as "Mullen.jpg" or "LeFanu.pdf", are in the user's document box, this may be printed.

Also, as a character string of a specifier that specifies printing or transmitting an e-mail with setting a sender, if "Print (sender's mail address) attachment=yes" is specified, this sender's e-mails may be printed with the attached file. Also, as a character string of a specifier that specifies a user ID and a password, and an address to access, after terms, such as "(cloud service name)", "SMB", or "E-mail", the user ID and the password may be specified by terms, such as "ID:" and "PW:". Thereby, it becomes possible to acquire a document file from terminal 1, image forming apparatus 2, server 3, other servers, or the like, and to transmit to image forming apparatus 2, and to transmit an image data scanned in image forming apparatus 2 to a transmission destination.

Figure 7:
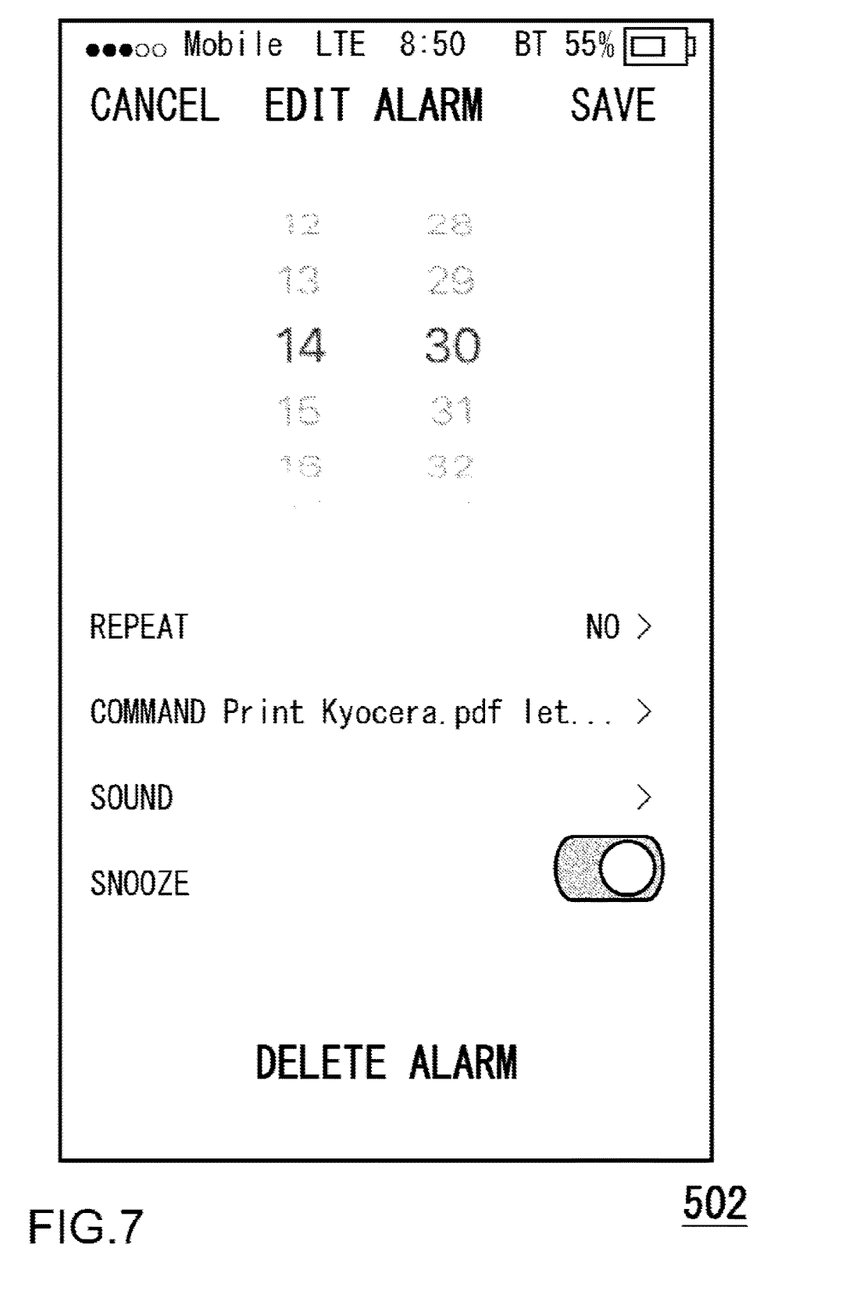
FIG. 7 shows an example screen of the image forming apparatus controlling process as shown in FIG. 4.

Example screen 502 in FIG. 7 shows an example at the time of command 310 being set by the user. In this example, if a user touches "EDIT ALARM" column, it is possible to make contents of other commands 310 select and edit. Also, if he or she touches "DELETE ALARM" column, it is possible to delete set-up command 310. Command acquiring part 110 sets the character string of command 310 inputted by the user in memory part 19.

In addition, if job 300 is generated from the dedicated application, command acquiring part 110 may execute an above-mentioned job accumulation process after the input of command 310. Also, the user can add image forming apparatus 2 for a transmission destination by using the menu column of the dedicated application, or the like. Also, user can specify image forming apparatus 2 as a transmission destination for each job 300, and he or she can set up the application of "alarm" and "calendar", an address of a document box or server 3, or the like.

(Step S103)

Then, command interpreting part 120 performs a command interpreting process. Command interpreting part 120 interprets the character string of command 310 set in memory part 19. Thereby, command interpreting part 120 sets attribute data with the control data of image forming apparatus 2 to command 310 and stores it in memory part 19.

(Step S104)

Then, command instructing part 130 performs a time acquiring process. Command instructing part 130 acquires the present time from an internal clock, GPS, a radio wave base station, server 3, or the like.

(Step S105)

Then, command instructing part 130 determines whether or not it is the set time. For example, command instructing part 130 determines to Yes if the present time is the specific time before the set time in command 310. The specific time may be sufficient time for waking up image forming apparatus 2, such as several seconds—several tens or hundreds of seconds, or the like. Command instructing part 130 determines to No, if other.

In Yes, command instructing part 130 advances a process to Step S106.

In No, command instructing part 130 returns a process to Step S104, and standby state is continued until it comes the specific time before the set time comes.

(Step S106)

If it is the specific time before the set time, command instructing part 130 performs a command instructing process. Command instructing part 130 performs the instruction that execute job 300 in image forming apparatus 2 corresponding to the contents of command 310. In this case, command instructing part 130 may transmit a magic packet, or the like, and may make image forming apparatus 2 start the specific time before executing job 300. The sending the magic packet, or the like, maybe after instructing to execute job 300 but before the actual execution. Thereby, image forming apparatus 2, which is in the standby state, or the like, becomes in the active status, and received job 300 can be executed, immediately. Also, command instructing part 130 may transmit job 300 stored in memory part 19 or job 300 accumulated in server 3 to image forming apparatus 2, which is set. Also, command instructing part 130 may instruct to execute scanning to image forming apparatus 2.

Then, the job executing part 200 in image forming apparatus 2, or the like, which acquires job 300, executes job 300 corresponding to the instructions acquired from command instructing part 130 in terminal 1. Job executing part 200 can execute job 300 of a print, job 300 of a scan, and job of a transmission 300, or the like, corresponded to the instruction, respectively. As above-mentioned, the image forming apparatus controlling process according to the embodiment in the present disclosure is ended.

The following effects can be obtained with a configuration as mentioned above. In a typical image forming apparatus, after a job has been reserved in an image forming apparatus, even in a case where settings of an alarm or a calendar in the user terminal is changed, the job cannot be executed in the image forming apparatus as coupled to the change of setting by the user, directly.

On the other hand, image forming system X according to the embodiment in the present disclosure includes terminal 1 and image forming apparatus 2. Terminal 1 includes job accumulating part 100, command acquiring part 110, command interpreting part 120, and command instructing part 130. Job accumulating part 100 accumulates job 300. Command acquiring part 110 acquires command 310 for setting time and executing for job 300 accumulated by job accumulating part 100. Command interpreting part 120 interprets command 310 acquired by command acquiring part 110. Command instructing part 130 instructs to execute job 300 in image forming apparatus 2 at the set time corresponding to command 310 interpreted by command interpreting part 120. Image forming apparatus 2 includes job executing part 200. Job executing part 200 executes job 300 with an instruction of command 310 acquired from command instructing part 130 in terminal 1.

As configured in this way, it becomes possible to directly-couple settings of the alarm or the calendar, or the like, in terminal 1 for the user and to execute job 300 with instructions from terminal 1. Also, it becomes to set about job 300, flexibly, with an operation of terminal 1 that is familiarity to the user. Also, it becomes possible to process transmitting data of a print to a specific user, at specific date, such as St Valentine's Day or a user's birthday, or the like, easily. Therefore, the usability according to control of job 300 for the user becomes better.

Also, as for terminal 1 according to the embodiment in the present disclosure, command 310 corresponds to job 300 of a print, a scan, and/or a transmission.

As configured in this way, it becomes possible to control job 300 corresponding to various function of image forming apparatus 2 from terminal 1, easily.

Also, as for terminal 1 according to the embodiment in the present disclosure, command 310 includes a specifier of a repetition for a specific period as time.

As configured in this way, it becomes possible to instruct to execute job 300 with repeat settings, or the like, flexibly and easily, if required.

Also, as for terminal 1 according to the embodiment in the present disclosure, command 310 includes a specifier that sets job 300 by a specific formula.

As configured in this way, it becomes possible to select required job 300, easily, and to execute it.

Also, as for terminal 1 according to the embodiment in the present disclosure, command 310 includes a specifier that sets a sender, and prints or transmits an e-mail.

As configured in this way, it can execute job 300 that requires to distribute and output from many e-mails, easily.

Also, as for terminal 1 according to the embodiment in the present disclosure, command 310 includes a specifier that sets a user ID and a password, and an address to access.

As configured in this way, it becomes possible to execute job 300 made to cooperate with the server 3 on a cloud, or the like, easily.

Also, as for terminal 1 according to the embodiment in the present disclosure, command instructing part 130 starts image forming apparatus 2 at a specific time before executing job 300.

As configured in this way, it becomes possible to ensure executing of job 300 at the time specified by a user.

[Other Embodiments]

In addition, in the embodiment in the present disclosure, it is written that command 310 is set up by a character string. However, it may be set, directly, by using GUI, such button on the dedicated application or the device driver, is possible. Also, on the contrary, from a terminal application in terminal 1, or the like, command 310 may be set up, directly, by using a script language, or the like. In such a case, a character string may be inputted by the standard stream (stdin) of the dedicated application, or the like.

As configured in this way, command 310 can be flexibly-set up according to user environment.

Also, in the above-mentioned embodiment, although it is written that the time of command 310 is set up corresponding to time of an alarm or a calendar, it is not limited to the case. For example, time may be set up by a OS command, such as "cron", or function of OS, such as a task scheduler, or the like. Also, it is possible to be inputted a command converted into a form of file for OS, such as a batch file, from the providing page of a built-in Web server of OS, or the like. Also, it is also possible for a job to schedule by using a service and a demon of OS.

As configured in this way, even if the dedicated application, alarm, calendar, or the like, has hung up, it becomes possible to execute job 300 by using the function of OS.

Also, the present disclosure is applicable to information processing apparatus other than an image forming apparatus. That is, it may be a configuration by using a network scanner, a server that connected with a scanner, separately, by using USB, or the like.

Also, the configuration and operation of the above-mentioned embodiment is an example, and it cannot be over-emphasized that it can change suitably and can execute in the range that does not deviate from the aim of the present disclosure.

What is claimed is:

1. An image forming system having a terminal and an image forming apparatus connected to the terminal via a network, wherein:
   the terminal includes
   a job accumulating part configured to accumulate a job, wherein said job is a job that can be executed by the image forming apparatus and said job is selected from a print, a scan, and a transmission,
   a command acquiring part configured to acquire a command for executing the job accumulated by the job accumulating part and setting a time to transmit an instruction to perform said execution of the job,
   a command interpreting part configured to interpret the command acquired by the command acquiring part, and
   a command instructing part configured to transmit, to the image forming apparatus, the instruction to perform said execution of the job by the image forming apparatus, wherein said transmission of the instruction from the terminal to the image forming apparatus occurs at the set time corresponding to the command interpreted by the command interpreting part; and
   the image forming apparatus includes
   a job executing part configured to execute the job based on the instruction present in the transmission acquired from the command instructing part of the terminal.

2. The image forming system according to claim 1, wherein
   the command includes a specifier of a repetition for a specific period as the time.

3. The image forming system according to claim 1, wherein
   the command includes a specifier that sets the job by a specific formula.

4. The image forming system according to claim 1, wherein
   the command includes a specifier that sets a sender and prints or transmits an e-mail that was from said sender.

5. The image forming system according to claim 4, wherein the command prints the e-mail that was from said sender.

6. The image forming system according to claim 1, wherein
   the command includes a specifier that sets a user ID and a password, and an address to access, wherein the user ID and a password are used to retrieve a file located at the address and wherein the job is executed using the file.

7. The image forming system according to claim 1, wherein the command instruction part starts the image forming apparatus at specific time before executing the job.

8. A terminal comprising:
a job accumulating part configured to accumulate a job, wherein said job is a job that can be executed by an image forming apparatus and said job is selected from a print, a scan, and a transmission;
a command acquiring part configured to acquire a command for executing the job accumulated by the job accumulating part and setting a time to transmit an instruction to perform said execution of the job;
a command interpreting part configured to interpret the command acquired by the command acquiring part; and
a command instructing part configured to transmit, to the image forming apparatus, the instruction over a network to perform said execution of the job by the image forming apparatus, wherein said transmission of the instruction from the terminal to the image forming apparatus occurs at the set time corresponding to the command interpreted by the command interpreting part.

9. The terminal according to claim 8, wherein the command includes a specifier of a repetition of a specific period as time.

10. The terminal according to claim 8, wherein the command includes the specifier that sets the job by a specific formula.

11. The terminal according to claim 8, wherein the command includes a specifier that sets a sender and prints or transmits an e-mail that was from said sender.

12. The terminal according to claim 11, wherein the command prints the e-mail that was from said sender.

13. The terminal according to claim 8, wherein the command includes a specifier that sets a user ID and a password, and an address to access, wherein the user ID and a password are used to retrieve a file located at the address and wherein the job is executed using the file.

14. The terminal according to claim 8, wherein the command instruction part starts the image forming apparatus at specific time before executing the job.

15. A control method to control an image forming apparatus by a terminal, comprising the steps of:
accumulating a job, wherein said job is a job that can be executed by the image forming apparatus and said job is selected from a print, a scan, and a transmission;
acquiring a command for executing the accumulated job and setting a time to transmit an instruction to perform said execution of the job;
interpreting acquired command; and
transmitting, to the image forming apparatus, the instruction over a network to perform said execution of the job by the image forming apparatus, wherein said transmission of the instruction from the terminal to the image forming apparatus occurs at the set time corresponding to the interpreted command.

16. The control method according to claim 15, wherein the command includes a specifier of a repetition of a specific period as time.

17. The control method according to claim 15, wherein the command includes a specifier that sets the job by a specific formula.

18. The control method according to claim 15, wherein the command includes a specifier that sets a sender and prints or transmits an e-mail that was from said sender.

19. The control method according to claim 18, wherein the command prints the e-mail that was from said sender.

20. The control method according to claim 15, wherein the command includes a specifier that sets a user ID and a password, and an address to access, wherein the user ID and a password are used to retrieve a file located at the address and wherein the job is executed using the file.

* * * * *